Patented May 12, 1942

2,282,805

UNITED STATES PATENT OFFICE 2,282,805

STABILIZED COMBINATIONS OF RICE AND SIMILAR POLISHINGS AND WHEY OR SIMILAR MILK-SOLIDS-NOT-FAT

Sidney Musher, New York, N. Y., assignor to Musher Foundation Incorporated, New York, N. Y., a corporation of New York No Drawing. Application April 22, 1940, Serial No. 330,987

5 Claims. (Cl. 99—153)

The present invention relates to the stabilization of rice polishings and similar cereal polishings whereby those products are substantially stabilized against oxidative deterioration and particularly against both fat and protein decomposition.

It has now been found that valuable products may be produced by dispersing the rice polish in aqueous milk-solids-not-fat, particularly whey, and preferably in an acidified medium. The treatment is followed by subjecting the finished product to complete dehydration which may take the form of drying under reduced pressure, at atmospheric pressure, or toasting.

The rice polish, with or without part of the bran, in combination with the whey is stabilized against fat oxidation as well as against protein decomposition. The rice polish may be conveniently combined with the whey, preferably in the presence of substantial quantities of water, followed by removal of some or all of the water.

The whey utilized in accordance with the present invention is obtained from the manufacture of cheese and is the material drawn off after the milk has been curdled with rennet, for example, and after the curd has formed the proper degree of hardness. Of particular importance for use is the whey that is obtained from the manufacture of cottage cheese, whereby coagulation is effected by natural souring and the liquid has been heated nearly to boiling. The whey thus obtained may further be treated in order to remove a portion of the lactose, the lactose being allowed to crystallize out before producing the whey in concentrated or powdered form, preferably containing over 20% to 25% total solids.

The finished concentrated or dried whey is substantially free of casein and of fat and will contain about 72% lactose and 12% protein, the protein being substantially free of casein and being present in the form of milk albumin.

Where a portion of the lactose has been allowed to crystallize out, the whey will contain about 40% protein in the form of albumin and about 44% lactose with approximately 16% total ash, based upon the solids weight of the whey in concentrated, condensed or dried form.

Apparently in the production of the whey, antioxygenic action is materially enhanced and it appears as if the lactose is not responsible for the antioxygenic effect in view of the fact that the lactose content may be reduced from 72% to about 44% in the whey while enhancing its protective effect.

Moreover, it has been found of particular desirability to subject the whey to a temperature of at least about 220° F. and preferably to 235° F. to 245° F. for at least several minutes at some stage in its processing whereby the whey is caramelized. The caramelization process further enhances the protective effect of the whey and unless the whey has been subjected to this caramelization step, the most desirable results of the present invention are not secured.

Whey, as the aqueous medium in which the rice polish is dispersed, appears to react better than other milk-solids-not-fat. Other aqueous dispersions of milk solids may also be employed, however, including particularly buttermilk where at least a portion of the lactose has been converted to lactic acid. There may also be utilized evaporated buttermilk containing about 27% total solids, condensed or semi-solid buttermilk containing about 40% total solids, dry buttermilk rendered aqueous by dilution, skim milk in concentrated or dried form, whole milk, whey residue or other similar forms of milk-solids-not-fat.

As indicated above, these milk solids are preferably subjected to caramelization before being utilized in accordance with the present invention and they are desirably employed in concentrated or condensed form having at least about 20% total solids.

Where the milk solids are too concentrated or too viscous to secure complete dispersion of the rice polish in the aqueous milk solids, water or skim milk may be added until the proper dilution has been obtained.

It has been found that the combination of the rice polish and the whey after final concentration or powdering will be substantially stabilized against deterioration and particularly against fat and protein decomposition.

Moreover, it has also been observed that even where the rice polish has already developed an objectionable flavor and odor and undergone definite deterioration, that such objectionable flavor and odor may be substantially overcome by treatment with the whey or other milk-solids-not-fat in accordance with the present invention.

The rice polish is preferably finely divided and milled to about 25 mesh or more. The rice polish is then dispersed in the whey and the combination heated to an elevated temperature in excess of 170° F. to 180° F. and desirably to about 200° F. for at least several minutes or more.

The combination of the whey and rice polish is desirably adjusted to a pH of between about 4 and 6.8 and preferably to a pH between about 5.5 and 6 before subjecting it to the cooking, evaporating, concentrating or toasting operation. The pH adjustment may be made by the addition of such acid as citric, lactic, tartaric, malic, hydrochloric, phosphoric or acetic acid.

The rice polish may, for example, be combined with sufficient aqueous whey to produce a pasty mass or to disperse the polish thoroughly through the aqueous whey and, preferably after adjustment of the pH, the combination is cooked or heated at over about 170° F. to 180° F. and preferably to over 200° F. for a period of several minutes to 30 minutes or more. The cooked combination may then be further processed in an oven at 400° F. to 650° F.

The rice polish is to be finely dispersed in the milk solids may be passed through a colloid mill or similar device to separate the individual particles of the rice polish and disperse them thoroughly and completely throughout the milk solids.

The rice polish-milk solids combination may thereupon be concentrated or evaporated either under reduced pressure or at atmospheric pressure or completely dried as by spray or drum drying. In the resultant dried product, the rice polish particles are finely dispersed in the whey.

It is desirable for the finished product to contain not less than about 1% of milk solids against the solids weight of the rice polish and desirably not less than about 10% of the milk solids in order to obtain the most satisfactory stabilizing effect.

A particularly desirable product is prepared using about 10% to 40% of milk solids and 90% to 60% of rice polish solids in the finished concentrated or dried product.

In addition to using ordinary liquid unconcentrated whey or other unconcentrated milk solids, powdered whey may also be employed where it is rendered aqueous by dilution with water or similar material.

The powdered whey may be ground with the rice polish with the addition of water or the powdered whey may first be diluted with water, desirably to between 20% and 50% total solids, and then utilized as the dispersing medium for the rice polish.

Partially concentrated or condensed whey may also be employed with rice polish, the combination being preferably utilized in slightly acidified condition, but in any event, the rice polish being present in an aqueous dispersion of the milk solids.

It is not possible to obtain the fully desirable results of the present invention by merely preparing a dry mixture of the rice polish and ordinary powdered whey without subjecting the rice polish to dispersion with the whey in the presence of water and preferably at the elevated temperature in order to produce the stabilizing effect, followed by concentration or drying.

In place of subjecting the aqueous rice polish-milk solids combination to a colloid mill treatment, other treatment may be employed in which the rice polish particles are thoroughly ground to a fine paste or other fine state of division and the individual particles of the rice polish are substantially coated with and thoroughly intermingled with the milk-solids-not-fat.

Where the finished product is to be used for fortifying flour used in the manufacture of bread or other bakery products, the addition of flavoring materials is not necessary.

Where the rice polish is to be used, however, in the preparation of special rice polish cereals, cereal flakes or similar products, the rice polish may be dispersed in the milk solids and cooked with the addition of flavoring materials including, for example, cane sugar, beet sugar, malt sugar, dextrose and salt.

Apparently, some reaction occurred at the elevated temperature whereby the rice polish in intimate contact with and intimately dispersed in the aqueous whey acquires enhanced stabilization and this elevated temperature treatment is very important in order to obtain the fully desirable stabilizing features of the present invention.

Where the rice polish milk combination is too heavy to be handled satisfactorily on the drying rolls or where the drying rolls cannot be sufficiently cut down in speed in order to handle the drying, a small amount of additional water or skim milk may be added to the combination to facilitate drying.

Moreover, where it is desirable for the finished product to contain smaller proportions of the stabilized polish, the polish may be replaced in part with other cereals, such as with ordinary dehulled rice or rice flour, corn grits, oat flour, wheat flour, or other cereals in finely divided condition and in the presence of water followed by thoroughly mixing the drying with a heat treatment.

The rice polish milk solids combination thus prepared may desirably be employed for use in baking such as in bread baking and for addition to wheat flour, for use in the manufacture of candies and confections, for use in dairy products and other foods and also for use in the preparation of special cereal products where the rice polish in substantially stabilized condition may be included in part or whole.

Among other cereal polishes that may be utilized for combination with whey and other similar milk solids in accordance with the present invention are included oat polish, and wheat polish which may or may not contain a portion of the bran along with the polish. Other vegetable polishes and outer skins that may similarly be stabilized against deterioration include particularly the peanut redskins, coffee chaff and cacao polish which may include part or all of the cacao shell.

The cereal polishes obtained from the sprouted or germinated cereals may similarly be stabilized against oxidative deterioration.

Where desired, there may also be added to the rice polish-whey combination a small amount of a combination of a sugar and a phosphatide such as a combination of equal parts of dextrose and lecithin. Particularly where the slightly acidified combination is subjected to the elevated temperature, the combination of sugar and phosphatide will enhance the stabilization effect.

Where both dextrose and lecithin are employed, both the dextrose and lecithin as well as the rice polish may be finely dispersed throughout the aqueous medium as by running through a colloid mill. During or following the colloid mill or other grinding treatment, the mixture is desirably heated in excess of 180° F. and desirably to over about 210° F.

The caramelization of the milk solids, such as of the whey, buttermilk or skim milk, is important to obtain enhanced stabilizing results. For example, skim milk may be boiled or caramelized at a temperature of 245° F. for 30 minutes and the resultant caramelized milk will then exert a stronger antioxygenic action on the rice polish when the rice polish is thoroughly dispersed through it than if ordinary non-caramelized milk solids are employed.

The dispersion of the cereal polishes such as rice polish in an aqueous suspension of finely divided malted or germinated cereal or seeds, preferably malted barley, and desirably where the combination is subjected to a temperature over 200° F. to 210° F., followed by concentration or drying, also produces an enhanced stabilizing effect on the polish.

The present application is a continuation in part of applications, Serial No. 291,517 filed August 23, 1939, now Patent No. 2,198,198, Serial No. 239,319 filed November 7, 1938, now Patent No. 2,198,215, and Serial No. 317,175 filed February 3, 1940, now Patent No. 2,198,218.

Having described my invention, what I claim is:

1. A process of making a stabilized vegetable polish preparation which comprises dispersing the vegetable polish in aqueous caramelized milk-solids-not-fat, said preparation including a relatively small proportion of the milk-solids-not-fat with respect to the vegetable polish solids, said vegetable polish preparation being substantially stabilized against oxidative deterioration.

2. A process of making a stabilized cereal polish preparation which comprises dispersing the cereal polish in aqueous caramelized milk-solids-not-fat and then concentrating, said preparation including a relatively small proportion of the milk solids with respect to the cereal polish solids, said cereal polish preparation being substantially stabilized against oxidative deterioration.

3. A process of making a stabilized cereal polish preparation which comprises dispersing the cereal polish in aqueous caramelized whey and then concentrating, said preparation including a relatively small proportion of the caramelized whey with respect to the cereal polish solids, said cereal polish preparation being substantially stabilized against oxidative deterioration.

4. A process of making a stabilized cereal polish preparation which comprises dispersing the cereal polish in aqueous caramelized milk-solids-not-fat and then concentrating and drying, said preparation including a relatively small proportion of the milk solids with respect to the cereal polish solids, said milk-solids-not-fat having been caramelized at a temperature of at least 235° F., said cereal polish preparation being substantially stabilized against oxidative deterioration.

5. A process of making a stabilized rice polish preparation which comprises dispersing the rice polish in aqueous caramelized milk-solids-not-fat at a pH between 4 and 6.8 and then concentrating, said preparation including a relatively small proportion of the milk solids with respect to the rice polish solids, said rice polish preparation being substantially stabilized against oxidative deterioration.

SIDNEY MUSHER.